United States Patent [19]

Normington et al.

[11] Patent Number: 4,811,205

[45] Date of Patent: Mar. 7, 1989

[54] PIPELINE DISPLAY CONTROL APPARATUS WITH LOGIC FOR BLOCKING GRAPHICS PROCESSOR ACCESSES TO SHARED MEMORY DURING SELECTED MAIN PROCESSOR GRAPHICS OPERATIONS

[75] Inventors: Glyn Normington; Robin C. B. Speed, both of Winchester; Graham H. Tuttle, Southampton, all of United Kingdom

[73] Assignee: International Business Machines Corporation, Armonk, N.Y.

[21] Appl. No.: 748,089

[22] Filed: Jun. 24, 1985

[30] Foreign Application Priority Data

Jun. 25, 1984 [EP] European Pat. Off. ........... 84304304

[51] Int. Cl.[4] .......................... G06F 3/14; G06F 13/14

[52] U.S. Cl. .................................... 364/900; 364/521; 340/750; 340/799

[58] Field of Search ... 364/200 MS File, 900 MS File, 364/518, 521; 340/750, 798, 799

[56] References Cited

U.S. PATENT DOCUMENTS

| | | | |
|---|---|---|---|
| 4,148,070 | 4/1979 | Taylor | 358/160 |
| 4,258,418 | 3/1981 | Heath | 364/200 |
| 4,345,244 | 8/1982 | Greer et al. | 340/799 X |
| 4,470,109 | 9/1984 | McNally | 364/200 |
| 4,525,804 | 6/1985 | Mosier et al. | 364/900 |
| 4,549,273 | 10/1985 | Tin | 364/200 |
| 4,569,034 | 2/1986 | Findley et al. | 364/900 |
| 4,604,694 | 8/1986 | Hough | 364/300 |
| 4,661,812 | 4/1987 | Ikeda | 340/750 X |

OTHER PUBLICATIONS

Foley et al: "Fundamentals of Interactive Computer Graphics", published by Addison-Wesley Publishing Company, 1982, pp. 391-429.

Computer Design, vol. 20, No. 12, Dec. 1981, pp. 116-118 Winchester, Massachusetts, US: P. Killmon: "Bubble Memory Mass Storage Fits Graphics Terminal to Rugged Uses".

*Primary Examiner*—Archie E. Williams, Jr.
*Assistant Examiner*—Thomas C. Lee
*Attorney, Agent, or Firm*—Robert L. Troike; J. Dennis Moore; Frederick D. Poag

[57] ABSTRACT

A graphics display apparatus employs a general purpose or main microprocessor providing general control of the apparatus including receiving high-level graphic orders defining a desired graphic image from a host processor and dedicated graphics microprocessor connected to receive low-level graphic orders from the general microprocessor along a pipeline constituted by a shared buffer store. Pipeline control logic controls the pipeline by blocking the graphics processor which generally operates more quickly than the general processor until the latter has completed computation of all the low-level orders associated with a particular high-level order. The front-of-screen performance can be further improved by backing up the pipeline to repeat certain low-level orders rather than by obtaining these repeated orders by recomputation. Graphics hardware controlled by the graphics processor loads appropriate bit patterns into an all points addressable refresh buffer for subsequent display on a cathode ray tube monitor.

13 Claims, 3 Drawing Sheets

PIPELINE DISPLAY CONTROL APPARATUS WITH LOGIC FOR BLOCKING GRAPHICS PROCESSOR ACCESSES TO SHARED MEMORY DURING SELECTED MAIN PROCESSOR GRAPHICS OPERATIONS

This invention relates to a graphical display apparatus employing pipelined processors.

CROSS REFERENCE TO RELATED APPLICATIONS

In a graphical display apparatus such as that described in our co-pending patent application Ser. Nos. 639,760, 675,038, now U.S. Pat. No. 4,745,575, and 708,755 now U.S. Pat. No. 4,686,521 assigned to the same Assignee as the present invention, a graphical image to be displayed on a rastered cathode ray tube display is stored in a digital refresh store as a bit pattern, each picture element (pel) on the CRT display being represented by one or more bits in the refresh store. The bit pattern is loaded into the refresh buffer under control of special purpose dedicated hardware and a microprocessor which receives graphic orders via a second general purpose microprocessor.

BACKGROUND TO INVENTION

Typically the general purpose microprocessor may be constituted by an Intel 8088 processor and the dedicated graphics microprocessor by an Intel 8051 processor. Both processors share a common random access memory or buffer in such a manner that graphic orders received at the display apparatus by the general purpose processor are passed to the dedicated processor via the shared memory to be converted, in conjunction as necessary with the special purpose hardware into the bit pattern to be stored in the refresh buffer. The general purpose processor may either receive high-level graphic orders which it converts into low-level graphic orders for the graphic processor or it can also receive low-level graphic orders which it passes unchanged to the graphics processor.

The two processors write asynchronously in a producer/consumer relationship, communication being achieved via a queue or "pipeline" between the two processors. The first process, that is that performed by the general purpose processor generally runs much slower than the second so that the queue is usually empty. Chapter 10 (see in particular FIG. 10.17) of the book "Fundamentals of Interactive Computer Graphics" edited by Foley and Van Dam, published by Addison-Wesley Pubishing Company, 1982, describes a two-processor pipelined architecture for a graphical display.

Where the two processors are linked by a pipeline which is generally empty, flicker can occur when part of the graphics image or picture is moved across the display screen. Examples of such image movement include the use of a moving cursor or changing the magnitude or orientation or position of a displayed object. The flicker occurs because it takes some time to compute how the old picture is to be processed to remove it from the display, to change the picture description and to process the new description into the display. If the old image is removed before the new one is processed, the screen will contain no "echo" for one picture process time period and the time required to change the description. This can be perceptible to the human eye resulting in flicker.

One solution is to use two refresh buffers, processing new images into them alternately and switching between the refresh buffers when the new image is complete. Clearly this adds to the cost of the display apparatus since the whole refresh buffer (possibly 3 or 4 Megabits in size) has to be duplicated together with some complication in buffer accessing. Alternatively, small images may be merged by the video refresh logic of an arbitrary point on the display. This requires extra video logic and is constrained in the shapes that can be displayed: aforementioned application Ser. No. 639,760 generates cross-hair cursor elements in this manner.

SUMMARY OF INVENTION

An object of the present invention is to provide a graphic display apparatus in which images on the screen may be moved without flicker in an inexpensive manner without limitation as to their shapes.

According to the invention, a graphic display apparatus comprises a terminal control unit having input/output devices connected thereto and including a data processor connected to control the terminal control unit and to receive high-level graphic image orders defining a graphical image from a host processor, a display monitor connected to said terminal control unit by means of display control logic incorporating a graphics processor connected to receive low-level graphic orders from said data processor via a shared memory and to control loading of bit patterns representing said graphical image into a display refresh buffer, and means for reading the contents of said refresh buffer to display said graphical image on said display monitor, characterized in that said data processor, shared storage and graphics processor constitute a pipeline which is controlled by control logic means adapted to block operation of said graphics processor until after said data processor has completed processing of each high-level graphic order into a complete sequence of low-level graphic orders and to allow said graphics processor to process said sequence of low-level orders after completion of processing of the associated high level order by the data processor.

Performance can be further enhanced by recognizing that whilst manipulating an object on the screen, certain orders in the pipeline are repeated from one cycle to the next. By "backing up" the pipeline to the appropriate position rather than recomputing the order twice, the total cycle time can be reduced.

BRIEF DESCRIPTION OF DRAWINGS

The invention will now be particularly described, by way of example, with reference to the accompanying drawings, in which.

DESCRIPTION OF PREFERRED EMBODIMENT(S)

Figure 1:
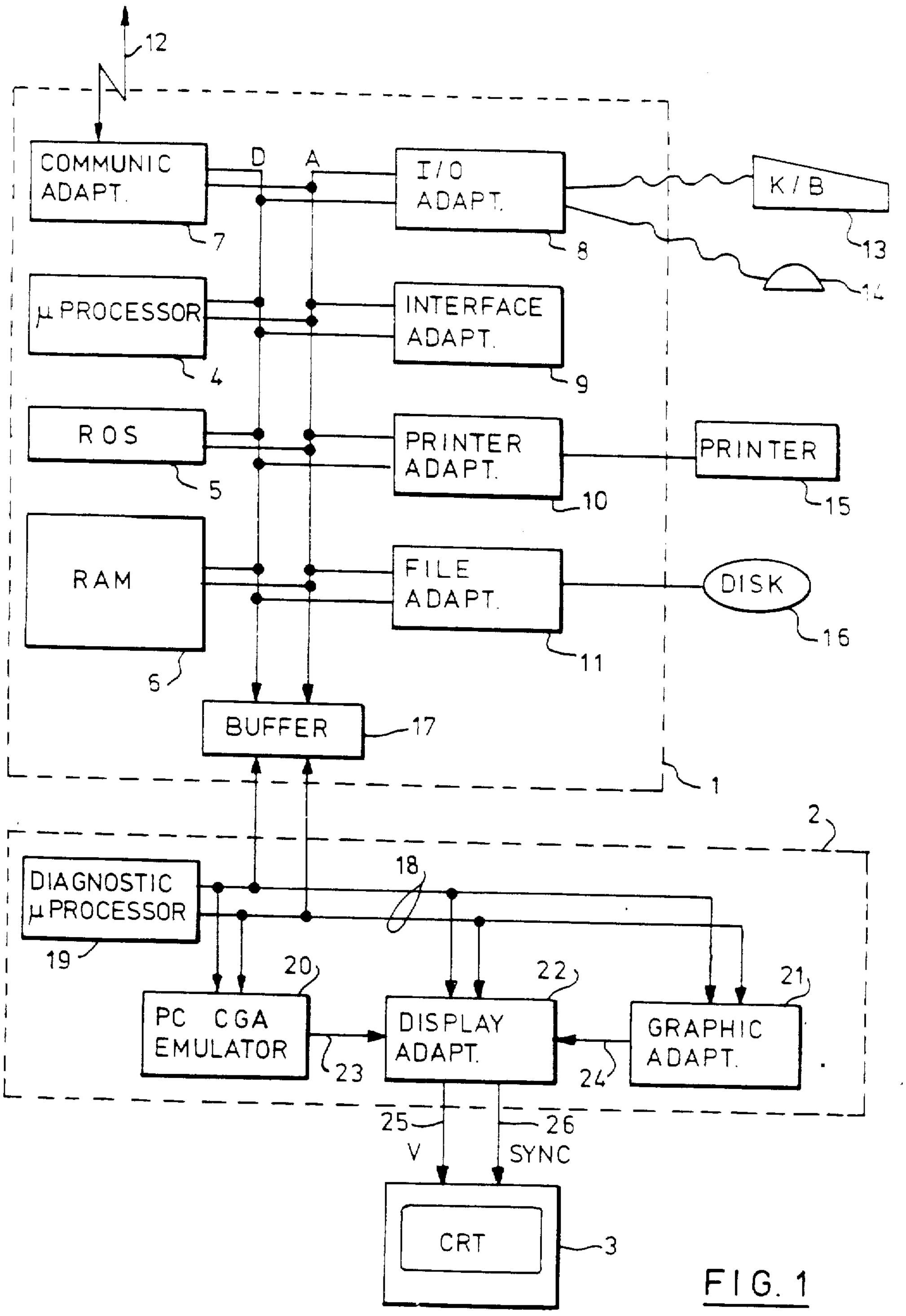
FIG. 1 is a block diagram showing the main parts of a graphic display apparatus.

Referring now to FIG. 1, a graphics display apparatus consists of three main parts, a terminal control or system unit 1 to which various input/output and storage devices may be connected, a display control logic unit 2 connected to the system unit 1, and a cathode ray tube display monitor 3 connected to and controlled by the display logic unit 2.

The system unit 1 includes a microprocessor 4, typically constituted by an Intel 8088 microprocessor, connected to data and address buses D and A respectively. Also connected to the buses are read only storage (ROS) 5 for containing control code for the microprocessor 4, random access memory (RAM) 6 which can contain data and control code needed by the microprocessor 4, and various adapters 7 to 11. The communications adapter 7 is used to enable the system unit 1 to communicate with a host computer (not shown) by means of communication link 12. The input/output (I/O) adapter 8 allows I/O devices such as a keyboard (K/B) 13, a mouse 14 or a digitizing tablet (not shown) to be connected to the system unit 1 to allow interaction with the apparatus by an operator.

An interface adapter 9 consisting of logic and buffers provides an external interface from the system unit 1 to other devices, not shown: typical external interfaces are those known as the RS 232 interface and the IEEE 488 interface and can be used for plotters etc. The parallel printer adapter 10 allows connection of a printer 15 to the system unit 1 to give a local printing capability. The magnetic file adapter 11 allows one or more magnetic disk files 16 to be connected to the system unit 7 to give increased data storage over that provided by RAM 6.

The unit 1 may be provided with further adapters, which, as is well known, provide appropriate buffering and timing for the various devices. The IBM Personal Computer and the IBM 3270 PC include system units similar to that described with reference to FIG. 1 so no detailed description of the system unit 1 or its various parts are believed to be necessary to an understanding of this invention. Buffer 17 connected to the data and address buses D and A, provides buffering of data and commands being transmitted between the system unit 1 and the display control logic unit 2. Buffer 17 essentially boosts the electrical signals in the buses D and A for transmission over the cable connecting units 1 and 2.

As shown in FIG. 1, the display logic control unit 2 includes an internal data and address bus 18 connected to the buffer 17 and to a diagnostic microprocessor 19, a personal computer color graphics adapter (PC CGA) emulator 20, a graphics adapter 21 and a display adapter 22 which provides alphanumeric (A/N) data to the CRT monitor 3 as well as receiving and mixing graphics data from the emulator 20 and adapter 21 on lines 23 and 24 respectively. The alphanumeric display adapter 22 supplies a composite red, blue and green video signal (V) and synchronization signals (SYNC) to the CRT monitor 3 on lines 25 and 26 respectively.

The diagnostic microprocessor 19 (typically an Intel 8051 microprocessor) is invoked whenever the system unit is powered on or at the request of the operator to conduct automatic diagnostic tests of the various component parts of the system unit 1 and the display logic control unit 2. No details of this diagnostic testing are included herein since they are not required for an understanding of the present invention.

The emulator 20 consists of logic and data storage which emulates the functions of the IBM Color Graphics Adapter for the IBM Personal Computer. Details of these functions are described in commonly assigned U.S. Pat. Nos. 4,437,092, 4,437,093 and U.S. application Ser. No. 573,790. The emulator 20 allows the graphic display apparatus of FIG. 1 to appear to the operator as if it were operating as an IBM Personal Computer fitted with the CGA card. Details of how the alphanumeric display adapter 22 mixes graphic (and cursor) data received on line 24 from the graphics adapter 21 are described in our aforementioned patent application Ser. No. 708,755.

Figure 2:
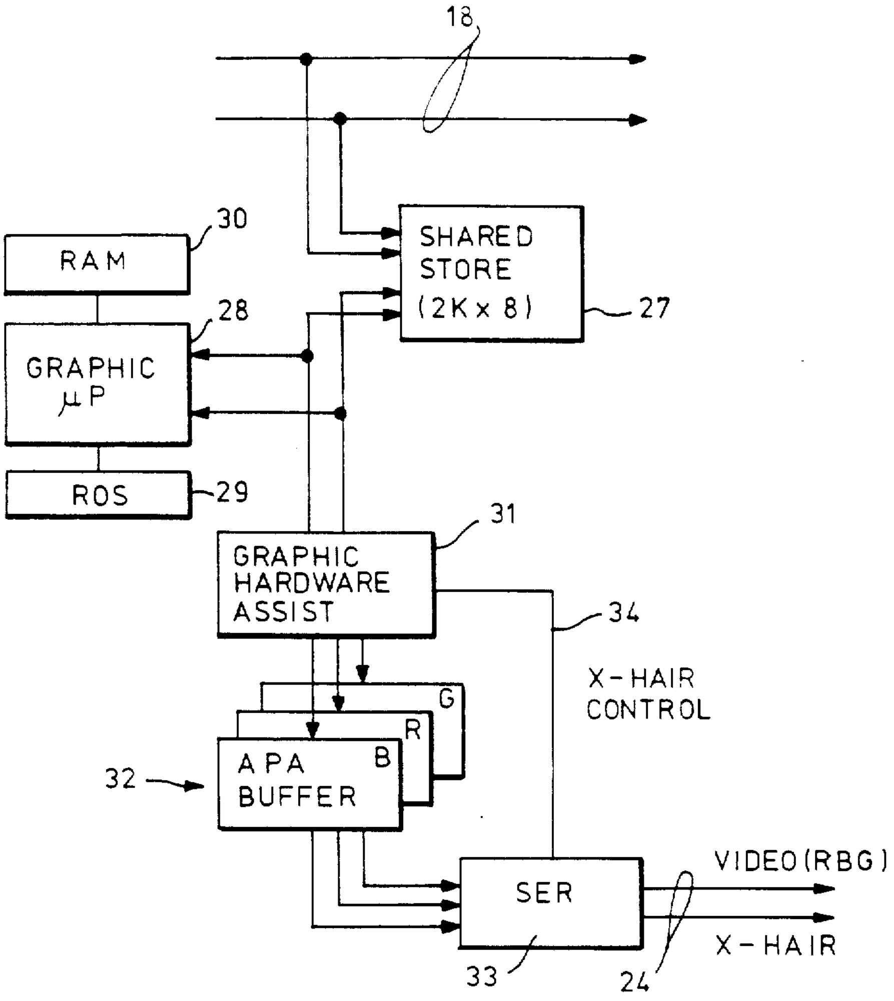
FIG. 2 is a data flow diagram showing the parts of the display apparatus with which the present invention is concerned.

FIG. 2 gives further details of the graphics adapter 21. Connected to the internal data and address bus 18 is a store 27, typically able to store up to 2048 (2K) 8-bit bytes accessible (shared) by the general microprocessor 4, FIG. 1, over data and address buses D, A and 18 via buffer 17 and by a graphics microprocessor 28, typically constituted by an Intel 8051 microprocessor. The graphics processor 28 is provided with a read only store (ROS) 29 containing control code and a random access memory (RAM) 30 for containing control code and data to be manipulated by the processor 28.

Special purpose hardware 31 is connected to the shared store 27 and graphic processor 28. The hardware 31 provides assistance to the graphics processor 28 in the manner described in aforementioned patent application Ser. No. 675,038 and relieves the graphics processor of certain tasks, thus improving its performance. Desired bit patterns are loaded into the three color planes of an all points addressable (APA) refresh buffer 32. The APA buffer 32 will be periodically addressed by the CRT refresh logic (not shown) to provide appropriate bit patterns to a serializer 33 which provides a red, blue and green graphic video signal and cross hair signal on lines 24. As described in the aforementioned patent application Ser. No. 639,760, hardware 31 controls the generation of the cross hair signal by means of line 34.

As mentioned above, the general purpose or main microprocessor 4, FIG. 1, receives high-level graphic orders from the remote host processor which it converts into low-level graphics orders and passes via the shared store 27 to the graphics processor 28 for action. The processor 4 can also receive low-level graphic orders which it can pass unchanged to the graphics processor 28. Although the general processor 4 is generally more powerful than the graphics processor 28, it has more tasks to perform and generally the queue or pipeline between the two processors will be empty. Flicker can occur when part of the graphic picture or image needs to be changed if the "old" image is removed before the "new" picture is processed.

Figure 3:
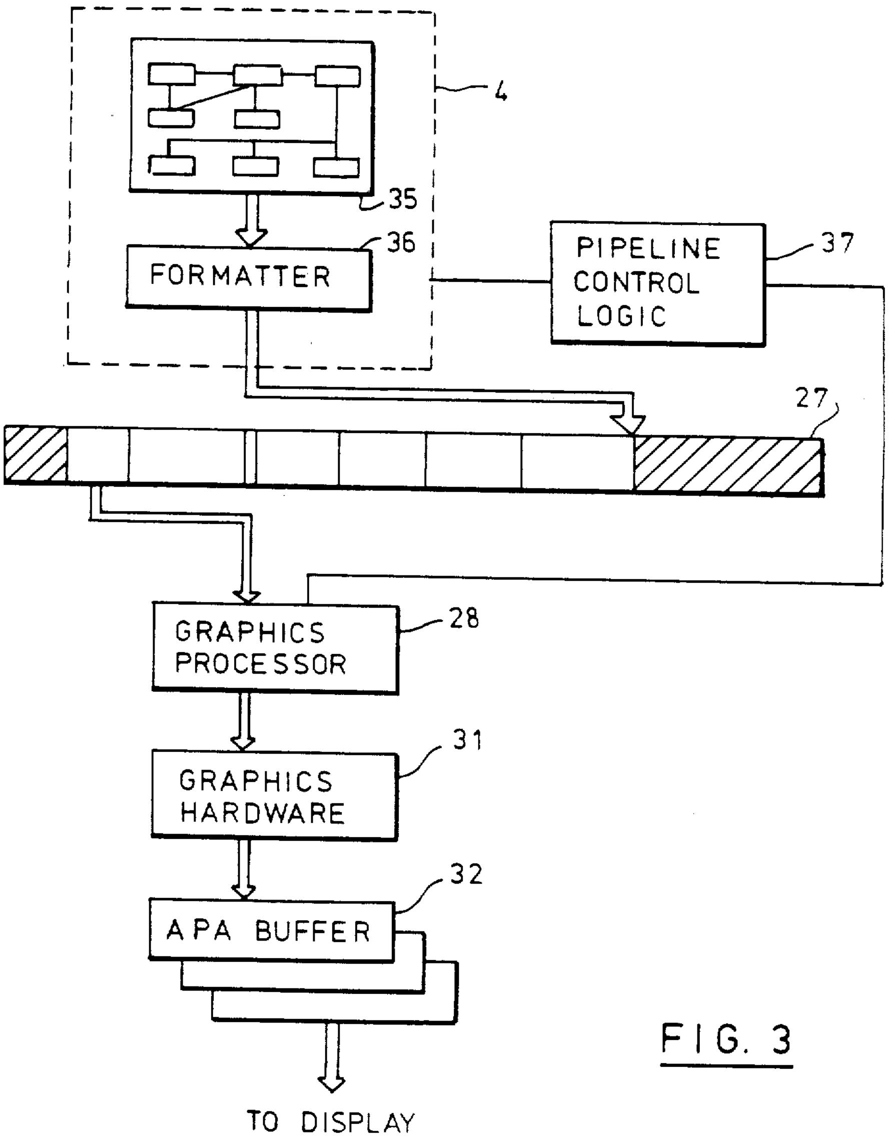
FIG. 3 shows the system structure illustrating how the two microprocessors are operated in a pipelined manner.

FIG. 3 summarizes the system structure in which the general processor 4 receives a high level picture description represented by 35, which it processes and formats into orders for the graphics processors 28, as represented by 36. These orders are loaded sequentially into the shared buffer store 27 from whence they are decoded by the graphics processor 28. Under control of processor 28, the hardware 31 generates the points to be set into the APA refresh buffers 32.

The orders in the bytes of data written into the buffer store 27 by the formatter 36 instruct the graphics processor 28 to draw lines (vectors, arcs) on the screen, to set the color for following lines, select the Boolean function used to merge the points of the following lines with the contents of the APA refresh buffer, and so on. There are two shared controls, NEXT AVAILABLE and CURRENT ORDER. The NEXT AVAILABLE control indicates the position in the buffer store 27 at which the formatter 36 will write the next order. The CURRENT ORDER control indicates the position in the buffer store 27 from which the graphics processor 28 is reading an order. The graphics processor 28 will be stopped, waiting for work, if these two controls are the same. If they are different the graphics processor 28 has work to do.

The general processor 4 stores various formatter status indicators as follows. BLOCKED status indicates a condition which is set if the graphics processor 28 is prevented from processing subsequent orders put into the buffer store 27. RECORDING status indicates a condition set if orders in the buffer store 27 are to be re-used later. RECORD START indicates the position in the buffer store 27 of the first order to be re-used. RECORD LENGTH indicates the length of the re-usable orders. RECORD AVAILABLE indicates a condition which is set if the recorded orders are valid.

The following flow charts describe the high level process for updating the picture and the set of low level processes used to access the buffer store 27. Two specific orders are mentioned—JUMP (start) which causes the graphics processor to take its next order from the start of the buffer store, and NO-OP which is ignored by the graphics engine. An interlock is used between the two microprocessors to police accesses to the shared controls. It is used to prevent one processor reading a control whilst the other is updating it. In the following flowcharts, steps which hold this interlock continuously on are bracketted together thus:

| | | |
|---|---|---|
| { | 1. | Step |
| { | 2. | Step |
| | 3. | Step |
| { | 4. | Step |
| { | 5. | Step |
| { | 6. | Step |
| | 7. | Step etc. |

Flow Chart of High Level Process

1. Wait for user input.
2. BLOCK graphics processor (this prevents changes being made to screen until orders for new change have been created)
3. Check if recording of orders for last picture change is available.
4. If not available, skip to step 5.
   If available replay orders into buffer store and skip to step 6.
5. Re-generate orders for last picture change by processing high-level picture description.
6. Change picture description according to user's input.
7. Note that subsequent orders are to be recorded.
8. Generate the orders to reflect the changed picture description, directing the graphics processor to use exclusive-or mode so the same sequence of orders can be used to add the change to the display and subsequently to remove it.
9. Signal the end of the recording.
10. Release (unblock) the graphics processor (thus allowing it to reflect the change to the display).
11. Repeat from step 1.

The following sections describe the lower level processes used. The title of each section indicates which step in the main (high level) flow uses them.

BLOCK Graphics Processor (Step 2)

-continued

| | | |
|---|---|---|
| | i | Wait for graphics processor to complete current orders. |
| { | ii | Set JUMP (start) at NEXT AVAILABLE location in buffer store (This forces the graphics processor to process the (order set in step iii below) |
| { | iii | Set JUMP (start) order at start of buffer store. (This will cause the graphics processor to loop since it "points" to (itself) |
| { | iv | Change NEXT AVAILABLE to point at the end of the order set in step iii. |
| | v | Set BLOCKED condition. |

RELEASE GRAPHICS PROCESSOR (Step 10)

| | | |
|---|---|---|
| | i | Check BLOCKED status and skip next steps if not set |
| { | ii | Replace JUMP (start) order at start of buffer store with (NO-OP order |
| | iii | Reset BLOCKED status |

START RECORDING (Step 7)

| | | |
|---|---|---|
| | i | Set RECORD START from NEXT AVAILABLE, which is where the first-recorded order will be placed. |
| | ii | Set RECORDING and RECORD AVAILABLE status. |

END RECORDING (Step 9)

| | | |
|---|---|---|
| | i | Check RECORD AVAILABLE and if not set skip the following steps |
| | ii | Compute RECORD LENGTH as difference between NEXT AVAILABLE (which is the end of the last recorded order) and RECORD START |
| | iii | Reset RECORDING status |

WRITE ORDERS TO BUFFER STORE (Step 8)

| | | |
|---|---|---|
| | i | Check space between NEXT AVAILABLE and end of buffer store |
| | ii | If there is enough room for new order skip to step viii |
| | iii | If BLOCKED status use RELEASE GRAPHICS PROCESSOR to restart graphics processor |
| | iv | Wait for graphics processor to complete current list of orders |
| | v | Reset RECORD AVAILABLE (since the new order will now be written at the start of the buffer store overwriting the first recorded order, if any) |
| { | vi | Insert a JUMP (start) order at NEXT AVAILABLE (to cause graphics processor to restart at front of (buffer store) |
| { | vii | Set NEXT AVAILABLE to start of buffer store |
| { | viii | Write order at NEXT AVAILABLE position in buffer store |
| { | ix | Update NEXT AVAILABLE to end of order |

REPLAY RECORDING (Step 4)

| | | |
|---|---|---|
| | i | Copy recorded orders from RECORD START for RECORD LENGTH bytes to NEXT AVAILABLE position in buffer store |
| | ii | Set NEXT AVAILABLE to end of copied orders |
| | iii | Reset RECORD AVAILABLE |

To summarize the processes as described above, the graphics processor 28 is prevented from processing an order or orders from the main general processor 4 until the latter has completed its processing of the associated high level order, thereby avoiding fragmentation of the processing of the low level orders by the graphics processor. In addition, by avoiding the re-computation of values or orders that already exist in the shared buffer store, the performance of the general processor is improved. This gives a significant reduction in the flicker which would otherwise arise as an object is "dragged" or moved across the screen.

As an example, suppose that an object is being moved through three successive positions. Without the invention, at the end of the first cycle the queue or pipeline would contain:

"XOR at position 1, XOR at position 2".

At the end of the second cycle, it would contain

"XOR at position 2, XOR at position 3".

The sequence "XOR at position 2" would be computed twice, the first time to display at position 2 and the second time to erase at position 2, restoring the background it its initial condition. By recognizing that the queue (pipeline) already contains the required order at the start of the second cycle and by "backing up" the pipeline to the start of the sequence rather than recomputing it, lengthy recomputation is avoided with a significant reduction in the total cycle time.

The blocking mechanism causes the drawing orders (to remove the old shape and to draw the new one) to be processed in one short burst at the speed of the graphics processor (fast) rather than at the speed of the general processor (slow). This is less perceptible to the human eye giving smoother movement and no flicker. The queue is of finite size and it may be filled if the shape is sufficiently complicated. However as shown above it is a simple matter to detect that the condition is caused by a blocked pipeline rather than by slow processing and to release the block to create space in the queue. At this point some flicker may re-appear but this will not be so distracting since the eye will perceive the shape gradually disappearing and reappearing in its new position rather than vanishing and reappearing rapidly with blank periods between.

Control of the pipelined microprocessors in the manner described is represented in FIG. 3 by pipeline control logic block 37 which can either be implemented by means of microcode or by means of hard-wired logic. No detailed microprogram is included herein since clearly this would depend on the particular microprocessors used. However any person of normal skill should be able to generate the necessary control code in accordance with the flow charts described above. If logic 37 is constituted by code, it would normally be shown within the block 4 in a similar manner to the formatter 36. Similarly any logic designer of normal skill could design appropriate hard-wired logic to constitute the pipeline control logic 37.

What is claimed is:

1. A graphics display apparatus comprising a terminal control unit having input/output devices connected thereto and including a data processor connected to control the terminal control unit and to receive high-level graphic image orders defining a graphical image from a host processor, a display monitor connected to said terminal control unit by means of display control logic incorporating a graphics processor connected to receive low-level graphic orders from said data processor via a shared memory and to control loading of bit patterns representing said graphical image into a display refresh buffer, and means for reading the contents of said refresh buffer to display said graphical image on said display monitor, wherein said low-level graphic orders are stored in said shared memory which is connected to said data processor and said graphic processor, said data processor, shared memory and graphics processor comprise a pipeline which is controlled by pipeline control logic means for blocking said graphics processor from accessing said shared memory until after said data processor has completed processing of each high-level graphic order into a complete sequence of low-level graphic orders and storing said complete sequence of low-level graphic orders into said shared memory, and to allow said graphics processor to access said shared memory and to process said sequence of low-level orders after completion of processing of the associated high level order by the data processor.

2. Apparatus as claimed in claim 1, including means for unblocking from accessing said shared memory said graphics processor before the data processor completes processing of the associated high-level order if the shared storage becomes filled with low-level orders before the sequence is complete.

3. Apparatus as claimed in claim 1 or claim 2, wherein the pipeline control logic means causes said graphics processor to repeat as required low-level orders contained within said shared storage thereby to avoid recomputation of the repeated low-level orders by the data processor.

4. Apparatus as claimed in claim 1 or claim 2 in which the pipeline control logic means is constituted by control code accessible by said data processor.

5. Apparatus as claimed in claim 3 in which the pipeline control logic means is constituted by control code accessible by said data processor.

6. Apparatus as claimed in claim 1 or claim 2, wherein the pipeline control logic means further comprised an interlock mechanism for preventing one of the processors from accessing a control logic it shares with the other processor while that other processor is updating the shared control logic.

7. Apparatus as claimed in claim 3, wherein the pipeline control logic means includes an interlock mechanism selectively operable to prevent one of the processors from accessing a control logic it shared with the other processor while that other processor is updating the shared control logic.

8. Apparatus as claimed in claim 4, wherein the pipeline control logic means includes an interlock mechanism selectively operable to prevent one of the processors from accessing a control logic it shared with the other processor while that other processor is updating the shared control logic.

9. Apparatus as claimed in claim 5, wherein the pipeline control logic means includes an interlock mechanism selectively operable to prevent one of the processors from accessing a control logic it shared with the other processor while that other processor is updating the shared control logic.

10. Apparatus as claimed in claim 6, wherein the interlock mechanism is constituted by control code accessible by both of said processors.

11. Apparatus as claimed in claim 7, on which the interlock mechanism is constituted by control code accessible by both of said processors.

12. Apparatus as claimed in claim 8, on which the interlock mechanism is constituted by control code accessible by both of said processors.

13. Apparatus as claimed in claim 9, on which the interlock mechanism is constituted by control code accessible by both of said processors.

* * * * *